United States Patent [19]
Ikegami et al.

[11] Patent Number: 5,617,738
[45] Date of Patent: Apr. 8, 1997

[54] ENERGY CONVERTER

[75] Inventors: Yasuyuki Ikegami; Haruo Uehara, both of Saga, Japan

[73] Assignee: Saga University, Saga, Japan

[21] Appl. No.: 521,820

[22] Filed: Aug. 31, 1995

[30] Foreign Application Priority Data

Sep. 20, 1994 [JP] Japan ..................... 6-224918

[51] Int. Cl.$^6$ .................................................. F25B 39/04
[52] U.S. Cl. .................. 62/509; 62/512; 62/513
[58] Field of Search ............................ 62/114, 113, 509, 62/512, 513

[56] References Cited

U.S. PATENT DOCUMENTS

| | | | |
|---|---|---|---|
| 3,077,087 | 2/1963 | Japhet | 62/512 |
| 3,545,216 | 12/1970 | Chawla | 62/512 |
| 3,563,054 | 2/1971 | Lofgreen et al. | 62/512 |
| 3,664,150 | 5/1972 | Patterson | 62/512 |
| 4,329,855 | 5/1982 | Larsson | 62/509 |
| 4,840,042 | 6/1989 | Ikoma et al. | 62/114 |
| 5,254,279 | 10/1993 | Takemasa et al. | 62/114 |

FOREIGN PATENT DOCUMENTS

| | | | |
|---|---|---|---|
| 2004171 | 1/1990 | Japan | 62/512 |
| 2187570 | 7/1990 | Japan | 62/512 |

*Primary Examiner*—Ronald C. Capossela
*Attorney, Agent, or Firm*—Spencer & Frank

[57] ABSTRACT

The present invention relates to an energy converter for transferring thermal energy from a low heat source to a high heat source using a mixed medium for the purposes of increasing thermal energy transfer efficiency. The present invention improves performance of an evaporator and a condenser, reduces production cost of the device, improves performance over a wide range even with partial loads, and provides a highly efficient and polyfunctional energy converter having function as a refrigerator and a heat pump with one cycle, and function as a generator. The present invention relates to an energy converter including an evaporator for heat-exchanging a low heat source for a working fluid, a compressor connected to a fluid discharge side of the evaporator for compressing a discharge fluid, a condenser connected to a discharge side of the compressor for thermally exchanging the working fluid discharged from the compressor with a high heat source, a vapor-liquid separator connected to a discharge side of the condenser, a swelling device connected to a vapor discharge side of the vapor-liquid separator for swelling a discharged vapor, a reducing valve connected to a liquid discharge side of the vapor-liquid separator for reducing a liquid, a mixer for mixing a swollen vapor from the swelling device with a reduced liquid from the reducing valve, and a heat exchange cycle formed by connected piping for evaporating a discharge fluid of the mixer or the absorber with the evaporator.

11 Claims, 4 Drawing Sheets

ENERGY CONVERTER

BACKGROUND OF THE INVENTION

1. Field of the Invention

The present invention relates to an improvement of an energy converter for transferring thermal energy from a low heat source to a high heat source with the use of a mixed medium, for increasing performance of transferring thermal energy of the above energy converter, improving performance of an evaporator and a condenser, and reducing production costs of the converter. Moreover, the present invention improves the performance over a wide range even with partial loads, and provides a highly efficient and multi-functional energy converter having a function as a thermal power generator.

2. Description of the Related Art

In heat pumps and refrigerators of this kind for transferring thermal energy from a low heat source to a high heat source, hitherto, use has essentially been made of (1) compression-type devices with the use of a single component medium such as flon, ammonia and the like or an azeotropic mixed medium prepared by mixing various refrigerant carriers having the same boiling point (reverse Rankine cycle), (2) for the purpose of improving high performance for reverse Rankine cycles, compression-type devices with the use of a non-azeotropic mixed medium prepared by mixing various refrigerant carriers having different boiling points (Lorentz cycle), or (3) absorption-type devices (absorption cycle) combining a refrigerant carrier with an absorbent, such as ammonia with water, water with lithium bromide (LiBr) and the like.

In the known compression-type heat pumps and refrigerators for carrying out reverse Rankine cycles, improvement of a coefficient of performance is limited, particularly, when a temperature change of a heat source is large, a coefficient of performance becomes small. In order to eliminate this shortcoming, there have been developed compression-type heat pumps and refrigerators of Lorentz cycle that use of a non-azeotropic mixed medium prepared by mixing various refrigerant carriers having different boiling points. The compression-type heat pump and refrigerant of this cycle is based on the idea that a temperature changes when a medium phase-changes in an evaporator and a condenser, so that the temperature change with a heat source is matched, thereby increasing effective energy in the evaporator and the condenser, and reducing power of the compressor so as to largely increase a coefficient of performance.

However, the use of a non-azeotropic mixed medium disadvantageously lowers heat transfer efficiency in the evaporator and condenser, increases condensation pressure, lowers evaporation pressure and increases the power of the condenser. The lowering of this heat transfer efficiency particularly obviously occurs at the outlet of the condenser. This is because an easily condensable high boiling point medium is first condensed in the condenser, and a hardly condensable low boiling point medium is left at the outlet of the condenser. Therefore, there is known a method of dividing a condenser into multiple stages, separating a medium into a condensate condensed at each stage and vapor not condensed at each stage, condensing only the non-condensed vapor at a heat source again, and repeating these steps. However, even in this case, concentration of a low boiling point medium is gradually increased in the non-condensed vapor, and if complete condensation of the vapor is attempted at the heat source of a certain temperature, condensation pressure is forced to become high. Therefore, it is disadvantageous that power of the compressor cannot sufficiently be lowered, and the same also happens in the evaporator.

In an absorption-type heat pump and refrigerator, a coefficient of performance becomes small as compared with the above compression-type device. In this connection, there have been studied and developed multiple-effect absorption cycles, GAX (Generator-Absorber-Heat Exchanger Cycle) for reducing heating capacity of a regenerator by using part of the exhaust heat of an absorber for heating the regenerator, triple cycles and the like, but a higher coefficient of performance than that of the above compression-type device cannot be obtained.

There has been further studied and developed compression-absorption-type hybrid device combining a compression-type devices with an absorption-type device, but there remains the above point, that is, a problem of the lowering performance of the condenser and evaporator when using a mixed medium, and there is no expectation for high performance and compactness of the apparatus.

On the other hand, partial load in the known heat pump and refrigerator is controlled by controlling the circulating amount of a working medium, and further controlling the composition when using a mixed medium. However, big problems including the lowering of performance due to changes of circulating amount, difficult composition control, enlarged apparatus and the like.

SUMMARY OF THE INVENTION

An object of the present invention is to provide an energy converter for removing the above-described shortcomings in the prior art devices, improving a coefficient of performance of the heat pump and refrigerator, maintaining performance to partial load within a wide range, and reducing installation costs.

A characteristic of the present invention is as follows.

The present invention relates to an energy converter comprising an evaporator for heat-exchanging a low heat source for a working fluid, a compressor connected to a fluid discharge side of the evaporator for compressing a discharge fluid, a condenser connected to a discharge side of the compressor for thermally exchanging with working fluid discharged from the compressor for a high heat source, a vapor-liquid separator connected to a discharge side of the condenser, a swelling device connected to a vapor discharge side of the vapor-liquid separator for swelling a discharged vapor, a reducing valve connected to a liquid discharge side of the vapor-liquid separator for reducing a liquid, a mixer or an absorber for mixing a swollen vapor from the swelling device with a reduced liquid from the reducing valve, and a heat exchange cycle connected by piping for evaporating a discharge fluid of the mixer or the absorber with the evaporator.

Another object of the present invention is to provide an energy converter comprising an evaporator for heat exchanging a low heat source for a working fluid, a compressor connected to a fluid discharge side of the evaporator for compressing a discharge fluid, a condenser connected to a discharge side of the compressor for thermally exchanging with working fluid discharged from the compressor for a high heat source, a vapor-liquid separator connected to a discharge side of the condenser, a swelling device connected to a vapor discharge side of the vapor-liquid separator for swelling a discharge vapor, a mixer or an absorber for mixing a swollen vapor from the swelling device, a discharge fluid from the vapor-liquid separator with a fluid sent from a regenerator and a reducing valve, a regenerator for thermally exchanging a discharge fluid of the mixer or the absorber with a discharge liquid of the vapor-liquid separator, and a heat exchange cycle for connecting a discharge fluid from the regenerator to the evaporator thermally exchanged with the low heat source by piping.

As an embodiment of a working fluid in the present invention, use can be made of a fluid selected from a mixture of ammonia and water and a mixture of flon 32 and flon 134a. Flon 32 and flon 134a are fluids which have no possibility of destructing the ozone layer.

The energy converter mentioned in the present invention is an energy system for utilizing river water, underground water, air, solar heat, lake water, sea water, subterranean heat, warm drainage and steam discharged from factories, exhaust heat of thermal power stations and atomic power stations, exhaust heat of cities (sewage disposal plant, garbage disposal plant, transformer substation, underground town, subway, computer center, refrigerated warehouse, LNG, LPG, etc.) and the like.

When carrying out the present invention, a swelling turbine and the like is used as a swelling device. Moreover, it is characteristic to connect a generator to the swelling turbine, to generate electricity simultaneously with energy conversion, and to increase energy conversion efficiency. Furthermore, a compressor is connected to the swelling device, thereby utilizing revolving energy for revolution of the compressor so as to increase energy efficiency.

DESCRIPTION OF THE PREFERRED EMBODIMENTS

The preferred embodiments of the present invention are fully explained in detail by referring the attached drawings.

Throughout different views of the drawings, 1 is a low heat source, 2 is a high heat source, 3 is a working fluid piping, 4 is an evaporator, 5 is a compressor, 6 is a condenser, 7 is a vapor liquid separator, 8 is a reducing valve, 9 is a mixer (which can be an absorber), 10 is a swelling device and 11 is a regenerator.

Figure 1:
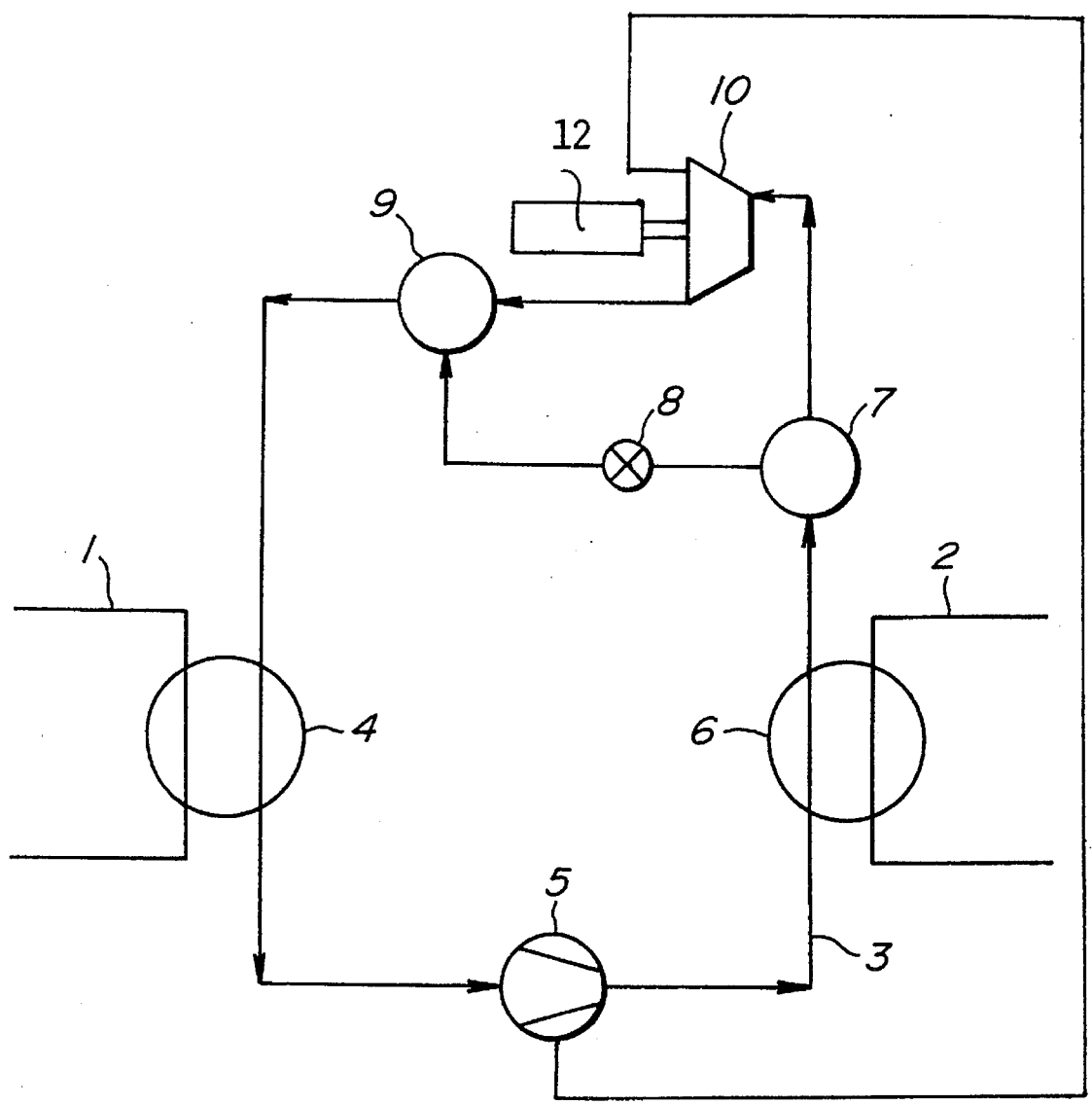
FIG. 1 shows an energy conversion cycle showing one embodiment of the present invention.

In FIG. 1, a connecting mode by piping is explained in detail. A low heat source 1 is connected to an evaporator 4 for thermally exchanging for a low heat source 1 with a high heat source 2. The evaporator 4 is connected to a compressor 5, a condenser 6 for thermally exchanging for a high heat source 2 and a vapor-liquid separator 7 via a working fluid piping 3 passed through the evaporator 4. A vapor is separated by the vapor-liquid separator 7, which is connected to a swelling device 10 (such as a swelling turbine) by the piping 3. A discharge vapor of the swelling device 10 is sent to a mixer 9. A discharge liquid from the vapor-liquid separator 7 is sent to the mixer 9 via a reducing valve 8 and the piping 3, and a discharge material from the mixer 9 is set to the evaporator 4 by piping. Thus, FIG. 1 shows a cycle.

Figure 2:
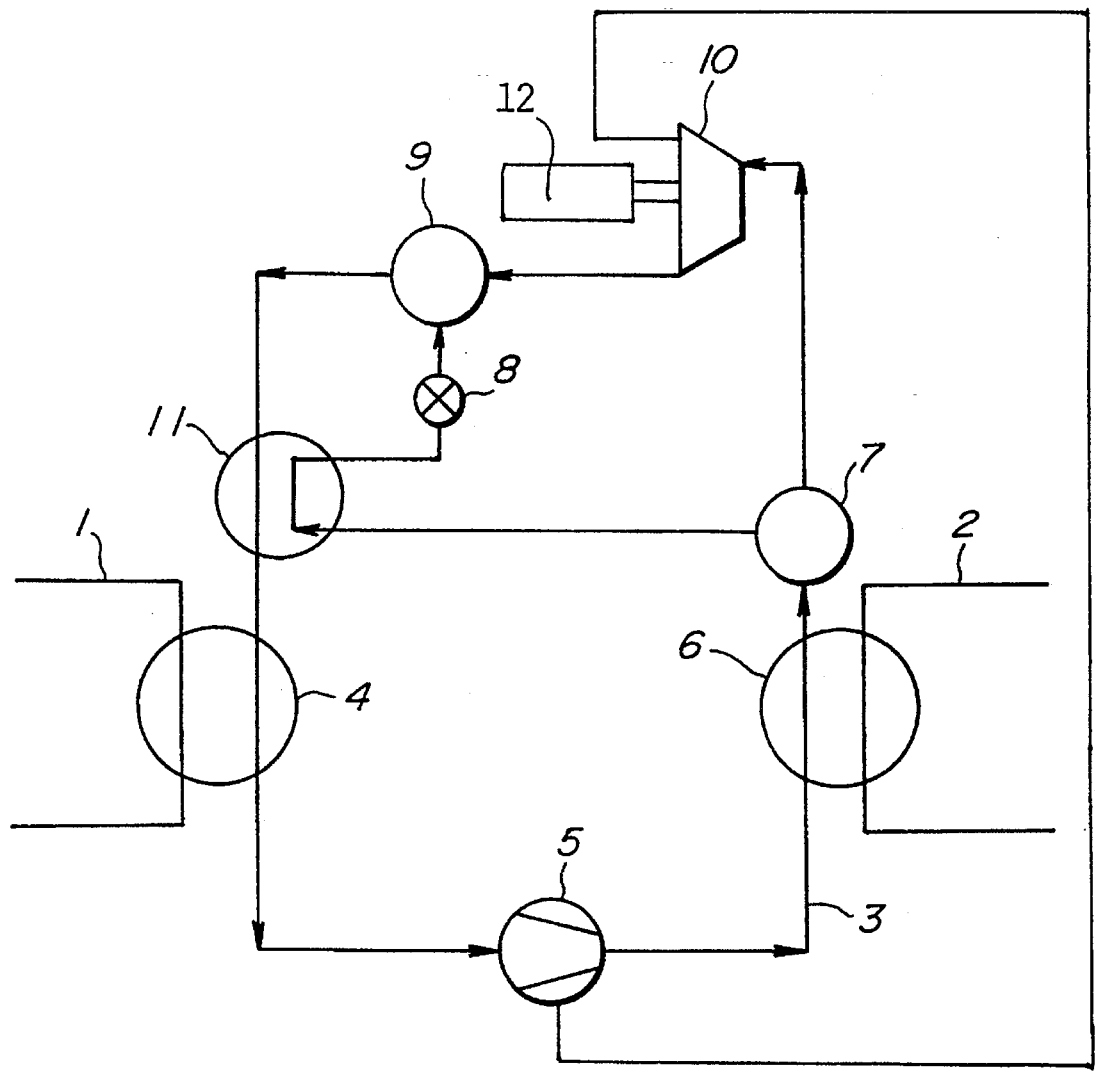
FIG. 2 shows an energy conversion cycle showing another embodiment of the present invention.

In operation, if circumstances require, it is effective to provide a plurality of evaporators 4, condensers 6, and swelling devices 10. Moreover, as shown in FIG. 2, when a regenerator 11 is installed between a reducing valve 8 and vapor-liquid separator 7 for recovering heat, heat recovery efficiency may effectively be increased.

In the illustrated embodiment, a working fluid vapor consisting of a mixture of 2–3 components having different boiling points is delivered to condenser 6. The working fluid vapor of the mixture is thermally exchanged with a high heat source 2 at the condenser 6, condensed to a two-phase state before a complete condensation state, and delivered into a vapor-liquid separator 7. The vapor-liquid separator 7 separates the mixture into vapor and liquid. The liquid is delivered to a reducing valve 8 and the vapor is delivered to swelling device 10. The liquid of this mixture is pressure reduced at the reducing valve 8 and thereafter delivered to mixer 9. On the other hand, the vapor of the mixture is worked at the swelling device, thereafter delivered to the mixer, and mixed with the pressure reduced liquid in the reducing valve 8. The liquid of the mixture leaving the mixer 9 is sent to evaporator 4, thermally exchanged with a low heat source 1, and evaporated. The vapor of this mixture is again sent to the condenser 6 by the compressor 5.

Without completely condensing the vapor of a low boiling point medium which returns to the condenser as before vapor-liquid separator 7 is installed behind the condenser 6 for separating the vapor containing many low boiling point mediums from the liquid containing many high boiling point mediums. The vapor containing many low boiling point mediums is recovered as power by swelling device 10, while the liquid containing many high boiling point mediums is reduced by reducing valve 8, or heat-recovered by a regenerator 11 (as shown in FIG. 2). As a result, heat transfer performance of condenser 6 and evaporator 4 is increased, and results in a compact device.

As a preferred embodiment of the working fluid of this device, mention may be made of a mixture of ammonia and water and a mixture of flon 32 and flon 134a. The optimum mixing ratio depends on the temperature and pressure to be utilized. In case of a mixture of ammonia and water, the higher the temperature utilized, the higher the water mixing ratio should be. In case of a mixture of flon 32 and flon 134a, the higher the temperature utilized, the higher the flon 134a mixing ratio should be. Concerning the mixture of ammonia and water and the mixture of flon 32 and flon 134a, the mixture of ammonia and water can be adapted up to a higher temperature range in comparison with the mixture of flon 32 and flon 134a, i.e., from (chlorofluoro-carbon).

Figure 3:
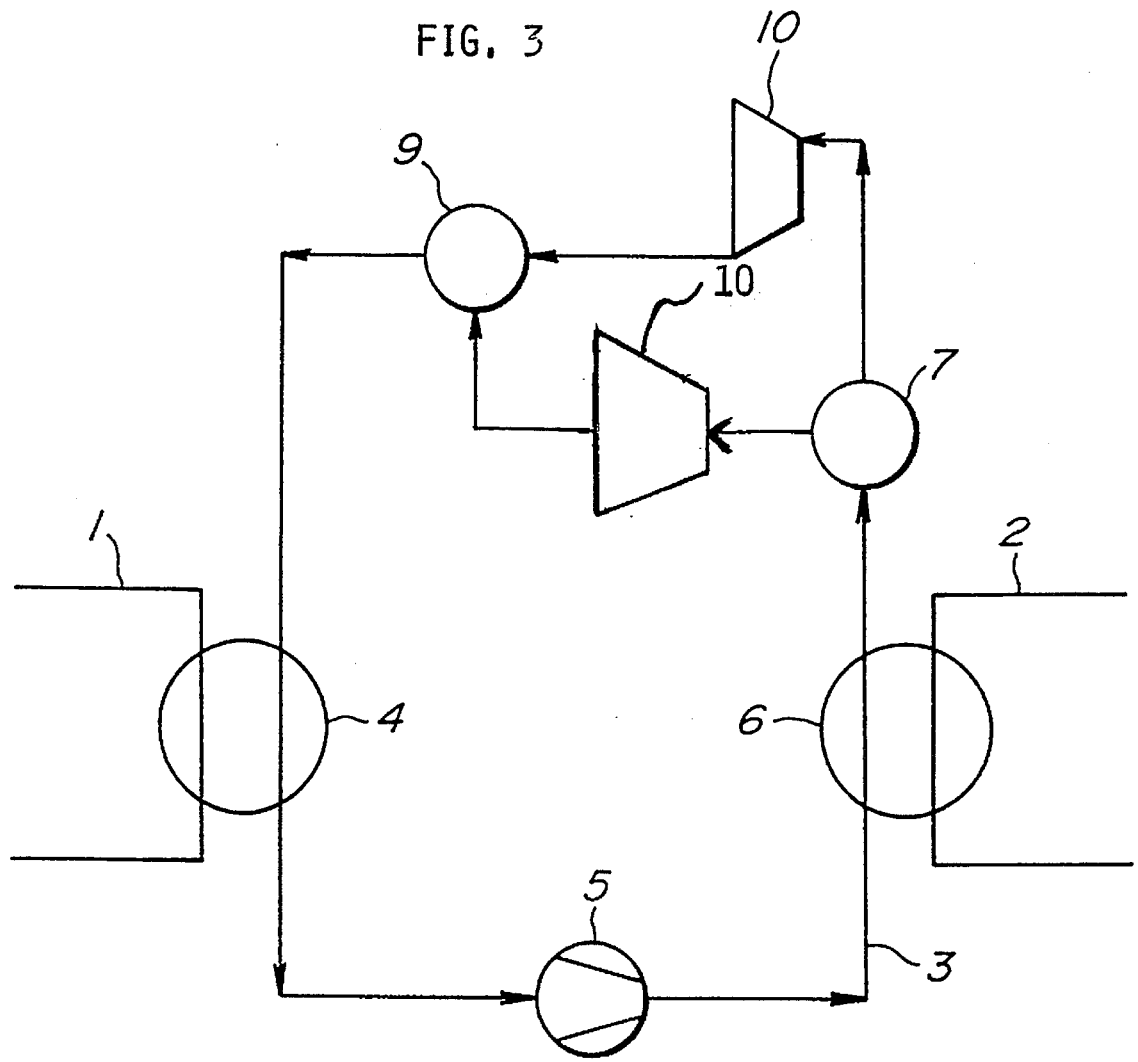
FIGS. 3 and 4 illustrate yet another embodiment of the present invention.
Figure 4:
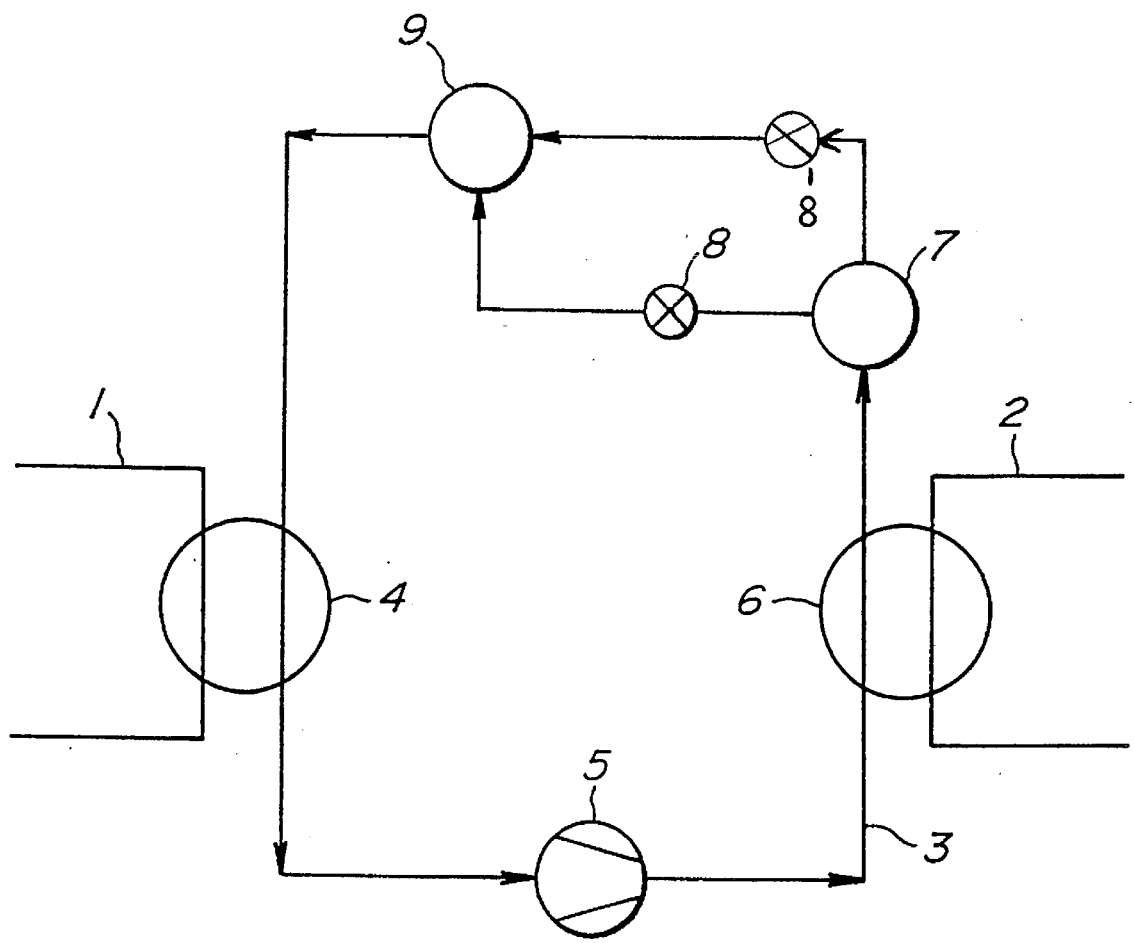

The power obtained by the swelling device 10 can be converted into electrical energy by attaching a generator 12 to the swelling device 10, such as a swelling turbine. On the other hand, this electrical energy is utilized as a part of the electrical energy necessary for compressor 5, and a coefficient of performance can be improved. Moreover, the power necessary for driving the compressor 5 can be reduced by connecting the swelling device 10 to the compressor 5, and a coefficient of performance can be improved. Moreover, it may be effective to provide a swelling device instead of a reducing valve 8 (as shown in FIG. 3), or a reducing valve instead of a swelling device 10 (as shown in FIG. 4).

A proportion of separating vapor from liquid of the mixture in the vapor-liquid separator 7 can be changed by changing pressure, temperature, working fluid flow rate and vapor-liquid separation properties of the vapor-liquid separator 7. By changing this vapor-liquid separation rate, it is possible to control the rate of power W in the swelling device 10 to thermal load Q in the condenser 6 and the evaporator 4. That is, when the rate of the power W is expected to be large, the rate of the vapor separated in the vapor-liquid separator 7 may be lessened. On the other hand, when controlling the thermal load, the working fluid flow rate is not controlled as before, but it is possible to only change the separating rate of vapor to liquid in the vapor-liquid separator 7 with respect to a certain flow rate. It thus becomes possible to control load without reducing the whole thermal efficiency with respect to partial load within a wide range.

The device of the present invention is effective by (1) utilizing compressed air cheaply stored by midnight power as a power source of a compressor 5 in the daytime, and generating electricity, together with functioning as a heat pump and a refrigerator, and (2) effectively, utilizing other energies (such as utilizing vehicle engine power as a power source of the compressor 5) and generating electricity, together with functioning as a heat pump and a refrigerator 5, such as functioning as an air conditioner in a car.

As apparent from the above explanation, the present invention has remarkable effects by installing vapor-liquid separator 7 behind condenser 6, such as the vapor containing many low boiling point fluids is separated from the liquid containing many high boiling point fluids by the vapor-liquid separator 7, the vapor containing many low boiling point fluids is recovered as power by swelling device 10, the liquid containing many high boiling point fluids is pressure reduced by reducing valve 8 or heat-recovered by regenerator 11, thereby increasing heat transfer performance, and efficiency of the energy converter can be increased.

As an example, in a known heat pump of a Lorentz cycle, with the use of a mixture of flon 32 and flon 134a, and with a high heat source inlet temperature of 40° C., a high heat source outlet temperature of 60° C., a low heat source inlet temperature of 10° C., a low heat source outlet temperature of 20° C., heat transfer performance (heat pass coefficient·heat transfer area/heat exchange amount) of 0.15 (1/K) at an evaporator 4, heat transfer performance of 0.15 K at a condenser 6, and a mass composition of 0.2 kg/kg of flon 32, a coefficient of theoretical performance becomes substantially 4.7, while it becomes substantially 5.1 in the present device under the same conditions. In this case, the coefficient of performance increases about 8%.

Moreover, conventional heat pumps and refrigerators have problems such as system performance lowering in case of partial load and the like, but according to the present invention, these problems can be improved by only controlling a separating rate at the vapor-liquid separator 7. Thus, the flow rate of the working fluid is uniform, and the separating rate at the vapor-liquid separator 7 is only changed. When a small ratio of thermal load Q is desired, a ratio of vapor separated at the separator 7 is increased. When a large ratio of thermal load Q is desired, the ratio of vapor separated at the separator 7 is reduced.

As an example, in the energy converter of the present invention, by using a mixture of flon 32 and flon 134a at high heat source inlet temperature of 40° C., a high heat source outlet temperature of 60° C., a low heat source inlet temperature of 10° C., a low heat source outlet temperature of 20° C., a heat transfer efficiency of 0.15 K at an evaporator 4, a heat transfer efficiency of 0.15 K at a condenser 6, and flon 32 mass composition of 0.5 kg/kg at the inlet of a separator 7, when a vapor-liquid separating rate (liquid mass/total inflow amount) at the separator is changed up to 0.1–0.8, and thermal load at the outlet of the condenser is changed from 1 KW to 2.66 KW, change of a coefficient of theoretical performance of the heat pump is slight and substantially constant.

We claim:

1. An energy converter, comprising:

an evaporator having an inlet for receiving a working fluid, and an outlet for discharging the working fluid therefrom, said evaporator being connected to a low heat source for thermally exchanging the working fluid with the low heat source and evaporating said working fluid;

a compressor having an inlet connected to the outlet of said evaporator for receiving said working fluid and having an outlet, said compressor compressing the working fluid and discharging the compressed working fluid through its outlet;

a condenser connected to a high heat source, and having an outlet and an inlet, said inlet being connected to the outlet of said compressor for receiving the working fluid discharged therefrom, said condenser thermally exchanging said working fluid with the high heat source and discharging the thermally exchanged working fluid through its outlet;

a vapor-liquid separator having an inlet connected to the outlet of said condenser for receiving the working fluid discharged therefrom, and having at least first and second outlets, said vapor-liquid separator separating the working fluid into a vapor and a liquid, discharging the working fluid vapor through its first outlet, and discharging the working fluid liquid through its second outlet;

a swelling device having an inlet connected to the first outlet of said vapor-liquid separator for receiving the working fluid vapor discharged therefrom, and having an outlet, said swelling device swelling the working fluid vapor and discharging the swollen working fluid vapor through its outlet;

a reducing valve having an inlet connected to the second outlet of said vapor-liquid separator for receiving the working fluid liquid discharged therefrom, and having an outlet, said reducing valve reducing the pressure of the working fluid liquid and discharging the pressure reduced working fluid liquid through its outlet; and a mixer having at least one inlet connected to the outlet of said swelling device for receiving the swollen working fluid vapor discharged therefrom, and being connected to the outlet of said reducing valve for receiving the pressure reduced working fluid liquid discharged therefrom, said mixer further including an outlet connected to the inlet of said evaporator, said mixer mixing the swollen working fluid vapor with the pressure reduced working fluid liquid to form a working fluid mixture which is discharged through its outlet and received by said evaporator to complete a heat exchange cycle.

2. The energy converter defined in claim 1, wherein the working fluid comprises one of a mixture of ammonia and water, and chloro-fluoro-carbons.

3. The energy converter defined in claim 1, wherein said swelling device comprises a swelling turbine, said energy converter further comprising a generator connected to said swelling turbine for generating power simultaneously with energy conversion.

4. The energy converter defined in claim 1, wherein the working fluid contains a plurality of mediums having low boiling points, and a plurality of mediums having high boiling points, said vapor-liquid separator separating the working fluid into a vapor containing the mediums having low boiling points and some high boiling points, and into a liquid containing the mediums having high boiling points and some low boiling points.

5. The energy converter defined in claim 1, wherein said compressor is connected to said swelling device for at least partially driving said compressor.

6. An energy converter, comprising:

an evaporator having an inlet for receiving a working fluid, and an outlet for discharging the working fluid therefrom, said evaporator being connected to a low heat source for thermally exchanging the working fluid with the low heat source and evaporating said working fluid;

a compressor having an inlet connected to the outlet of said evaporator for receiving said working fluid and having an outlet, said compressor compressing said working fluid and discharging the compressed working fluid through its outlet;

a condenser connected to a high heat source, and having an outlet and an inlet, said inlet being connected to the outlet of said compressor for receiving the working fluid discharged therefrom, said condenser thermally exchanging the working fluid with the high heat source and discharging the thermally exchanged working fluid through its outlet;

a vapor-liquid separator having an inlet connected to the outlet of said condenser for receiving the working fluid discharged therefrom, and having at least first and second outlets, said vapor-liquid separator separating the working fluid into a vapor and a liquid, and discharging the working fluid vapor through its first outlet, and discharging the working fluid liquid through its second outlet;

a swelling device having an inlet connected to the first outlet of said vapor-liquid separator for receiving the working fluid vapor discharged therefrom, and having an outlet, said swelling device swelling the working fluid vapor and discharging the swollen working fluid vapor through its outlet;

a mixer having at least one inlet connected to the outlet of said swelling device for receiving the swollen working fluid vapor discharged therefrom, said mixer further including an outlet connected to the inlet of said evaporator for discharging a working fluid mixture therethrough;

a regenerator connected to the outlet of said mixer, and having an outlet, and an inlet connected to the second outlet of said vapor-liquid separator for receiving the working fluid liquid discharged therefrom, said regenerator thermally exchanging the working fluid liquid from said vapor-liquid separator with the working fluid mixture from said mixer to form a regenerated working fluid that is discharged through its outlet; and a reducing valve having an inlet connected to the outlet of said regenerator for receiving the regenerated working fluid discharged therefrom, and having an outlet, said reducing valve reducing the pressure of the regenerated working fluid to form a pressure reduced working fluid that is discharged through its outlet;

wherein said mixer is additionally connected to the outlet of said reducing valve for receiving the pressure reduced working fluid therefrom, said mixer mixing the swollen working fluid vapor with the pressure reduced working fluid to form the working fluid mixture which is discharged through its outlet and received by said evaporator to complete a heat exchange cycle.

7. The energy converter defined in claim 6, wherein the working fluid comprises one of a mixture of ammonia and water, and chloro-fluoro-carbons.

8. The energy converter defined in claim 6, wherein said swelling device comprises a swelling turbine; further comprising a generator connected to said swelling turbine for generating power simultaneously with energy conversion.

9. The energy converter defined in claim 6, wherein the working fluid contains a plurality of mediums having low boiling points, and a plurality of mediums having high boiling points, said vapor-liquid separator separating the working fluid into a vapor containing the mediums having low boiling points and some high boiling points, and into a liquid containing the mediums having high boiling points and some low boiling points.

10. The energy converter defined in claim 6, wherein said compressor is connected to said swelling device for at least partially driving said compressor.

11. An energy converter, comprising:

an evaporator having an inlet for receiving a working fluid, and an outlet for discharging the working fluid therefrom, said evaporator being connected to a low heat source for thermally exchanging the working fluid with the low heat source and evaporating said working fluid;

a compressor having an inlet connected to the outlet of said evaporator for receiving said working fluid and having an outlet, said compressor compressing the working fluid and discharging the compressed working fluid through its outlet;

a condenser connected to a high heat source, and having an outlet and an inlet, said inlet being connected to the outlet of said compressor for receiving the working fluid discharged therefrom, said condenser thermally exchanging said working fluid with the high heat source and discharging the thermally exchanged working fluid through its outlet;

a vapor-liquid separator having an inlet connected to the outlet of said condenser for receiving the working fluid discharged therefrom, and having at least first and second outlets, said vapor-liquid separator separating the working fluid into a vapor and a liquid, discharging the working fluid vapor through its first outlet, and discharging the working fluid liquid through its second outlet; and at least one of the following arrangements:

a first swelling device having an inlet connected to the first outlet of said vapor-liquid separator for receiving the working fluid vapor discharged therefrom, and having an outlet; and a second swelling device having an inlet connected to the second outlet of said vapor-liquid separator for receiving the working fluid liquid discharged therefrom, and having an outlet, said swelling devices swelling the working fluids and discharging the swollen working fluids through their respective outlets; and a mixer having at least one inlet connected to the outlet of said first swelling device for receiving the working fluid vapor discharged therefrom, and being connected to the outlet of said second swelling device for receiving the working fluid liquid discharged therefrom, said mixer further including an outlet connected to the inlet of said evaporator, said mixer mixing the working fluid vapor with the working fluid liquid to form a working fluid mixture which is discharged through its outlet and received by said evaporator to complete a heat exchange cycle; and a first reducing valve having an inlet connected to the first outlet of said vapor-liquid separator for receiving the working fluid vapor discharged therefrom, and having an outlet; and a second reducing valve having an inlet connected to the second outlet of said vapor-liquid separator for receiving the working fluid liquid discharged therefrom, and having an outlet, said reducing valves reducing the pressure of the working fluids and discharging the pressure reduced working fluids through their respective outlets; and a mixer having at least one inlet connected to the outlet of said first reducing valve for receiving the working fluid vapor discharged therefrom, and being connected to the outlet of said second reducing valve for receiving the working fluid liquid discharged therefrom, said mixer further including an outlet connected to the inlet of said evaporator, said mixer mixing the working fluid vapor with the working fluid liquid to form a working fluid mixture which is discharged through its outlet and received by said evaporator to complete a heat exchange cycle.

* * * * *